United States Patent
Rivkin

(10) Patent No.: US 9,037,667 B2
(45) Date of Patent: May 19, 2015

(54) UNIFIED MESSAGE MANAGEMENT METHOD AND SYSTEM

(71) Applicant: Leon Rivkin, Hicksville, NY (US)

(72) Inventor: Leon Rivkin, Hicksville, NY (US)

(73) Assignee: DEVELOPONBOX, Hicksville, NY (US)

(*) Notice: Subject to any disclaimer, the term of this patent is extended or adjusted under 35 U.S.C. 154(b) by 0 days.

(21) Appl. No.: 14/058,468

(22) Filed: Oct. 21, 2013

(65) Prior Publication Data

US 2014/0047054 A1 Feb. 13, 2014

Related U.S. Application Data

(63) Continuation of application No. 13/101,326, filed on May 5, 2011, now abandoned.

(60) Provisional application No. 61/333,417, filed on May 11, 2010.

(51) Int. Cl.
 G06F 15/16 (2006.01)
 H04L 12/58 (2006.01)
 G06F 9/54 (2006.01)

(52) U.S. Cl.
 CPC .............. H04L 51/063 (2013.01); G06F 9/541 (2013.01); G06F 9/546 (2013.01)

(58) Field of Classification Search
 CPC ........ G06F 9/541; G06F 9/546; H04L 51/063
 USPC ............................ 709/206, 223, 246; 370/487
 See application file for complete search history.

(56) References Cited

U.S. PATENT DOCUMENTS

| | | | |
|---|---|---|---|
| 7,302,492 B1* | 11/2007 | Day ............................... | 709/238 |
| 7,788,319 B2* | 8/2010 | Schmidt et al. ............... | 709/203 |
| 7,805,746 B2* | 9/2010 | Brandyberry et al. ........ | 725/110 |
| 7,865,606 B1* | 1/2011 | Tewes et al. .................. | 709/230 |
| 8,626,716 B1* | 1/2014 | Katzer et al. .................. | 707/646 |
| 2004/0059819 A1* | 3/2004 | Hardcastle .................... | 709/227 |
| 2005/0022207 A1* | 1/2005 | Grabarnik et al. ............ | 719/313 |
| 2006/0112174 A1* | 5/2006 | L'Heureux et al. ........... | 709/223 |
| 2006/0128409 A1* | 6/2006 | Gress et al. ................... | 455/466 |
| 2007/0124406 A1* | 5/2007 | Liu et al. ....................... | 709/209 |
| 2007/0168184 A1* | 7/2007 | Lee et al. ...................... | 704/204 |
| 2007/0226754 A1* | 9/2007 | Grabarnik et al. ............ | 719/313 |
| 2007/0239895 A1* | 10/2007 | Alperin et al. ................ | 709/246 |
| 2007/0274465 A1* | 11/2007 | Othmer ......................... | 379/67.1 |
| 2007/0274473 A1* | 11/2007 | Skladman et al. ......... | 379/88.13 |
| 2007/0274474 A1* | 11/2007 | Singh et al. ................ | 379/88.13 |
| 2008/0112547 A1* | 5/2008 | Chin et al. ............... | 379/100.08 |
| 2008/0307058 A1* | 12/2008 | Brunswig et al. ............ | 709/206 |
| 2009/0217322 A1* | 8/2009 | Hindle ............................ | 725/39 |
| 2009/0320073 A1* | 12/2009 | Reisman .......................... | 725/51 |
| 2010/0115035 A1* | 5/2010 | Malhar et al. ................ | 709/206 |
| 2010/0235759 A1* | 9/2010 | Kang et al. .................... | 715/752 |

FOREIGN PATENT DOCUMENTS

EP 2252032 A1 * 11/2010

* cited by examiner

*Primary Examiner* — Oanh Duong
(74) *Attorney, Agent, or Firm* — Lawrence G. Fridman

(57) ABSTRACT

The proposed Advanced Messaging Solution (AMS) provides a non-intrusive cloud-based software application infrastructure through which MSOs and Service Providers can unify Web, mobile and set-top box device technologies with Enterprise and $3^{rd}$ party services, as well as Web/Internet Applications.

4 Claims, 7 Drawing Sheets

UNIFIED MESSAGE MANAGEMENT METHOD AND SYSTEM

CROSS-REFERENCE TO RELATED APPLICATIONS

This application is a Continuation of the currently U.S. application Ser. No. 13/101,326, Filed: May 5, 2011, which claims benefit of U.S. Provisional Application Ser. No. 61/333,417 filed May 11, 2010, the entire content of which is incorporated herein by reference.

BACKGROUND OF THE INVENTION

The present disclosure relates generally to message management systems and more specifically to a unified system and method using middleware for processing messages.

Messaging systems can provide services providers, subscribers, and others with a central service for processing a variety of messages such as network control signals, data packets, email, voicemail, faxes, and so on. Messaging systems can serve as an integration points for other systems in order to provide their subscribers with more advanced services. Messaging systems can also offer their subscribers helpful features such as text to voice presentation of messages and a web portal for managing messages. Such systems are known in the art, for example, in interactive TV set top boxes (STB) which allow a user to access programs and to surf the Internet or monitor telephone calls received via, for example, the network of a cable service provider. Messaging as used herein is to be broadly construed to include messages not seen by the end user.

In conventional embodiments, all applications need to carry their own service modules, which cause conflicts, reduce communication between applications and increase redundancy that consumes precious memory. Applications also need to be localized and tested for conformance with versions of the respective operating system. In other words, when new operating systems are introduced or operating systems are updated, applications may need to be rewritten and retested for the new environments.

Accordingly, there is a need for providing improved web and mobile-based messaging services across legacy and next generation STB technologies, including bidirectional connectivity across all screens. There is further a need to enable service providers to integrate these capabilities into the product mix with a minimal amount of development and integration work.

BRIEF SUMMARY OF THE INVENTION

The Advanced Messaging Solution (AMS) provides a non-intrusive cloud-based software application infrastructure through which Multi-System Operators (MSOs) and Service Providers can unify Web, mobile and set-top box device technologies with Enterprise and $3^{rd}$ party services, as well as Web/Internet Applications.

According to one aspect of the invention, a method operating in a messaging system includes the steps of receiving at the messaging system one or more messages in multiple input formats from an enterprise network or the Internet, or from a MSO or SSO system, processing the one or more messages with the messaging system to generate one or more output messages in the same or a different format, said output messages directed to a mobile device, STB or Browser enabled device, and transmitting the resulting output message using any of a unicast, multicast, or broadcast network to the mobile device, STB or Browser enabled device.

Advantageous embodiments of the present invention may include one or more of the following features:
  i.—real time or near real time generation of the application for the customer equipment;
  ii.—permanent and volatile storage of service related data;
  iii.—support for proprietary data formats, protocols, message types; and,
  iv.—custom business logic modules.

The input and output formats are usefully selected from the group comprising CSV, CFG, INI, XML, BCFG, ZIP, GZIP, EBIF, JSON, GScript, Microsoft Silverlight, TCP datagram, UDP packet, and an opaque message type. The use of other or later developed formats is also contemplated.

According to another aspect of the invention, a messaging system includes a controller configured to receive one or more messages in multiple input formats from an enterprise network or the Internet, or from a MSO or SSO system, process one or more messages with the messaging system to generate one or more output messages in the same or a different format, wherein the output messages are directed to another service providing system, a mobile device, STB or Browser enabled device, and transmit the resulting output message using any of a unicast, multicast, or broadcast network using any of available protocols including, for example, TCP, UDP, HTTP, HTTPS, FTP, FTPS, RPC, XML-RPC, POP, POP3, IMAP, IMAP4, SMTP, SNMP, NFS, WEBDAV.

These and other features and advantages of the present invention will become more readily appreciated from the detailed description of the invention that follows.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

DETAILED DESCRIPTION OF THE INVENTION

AMS enables multi-screen convergence for all messaging services by facilitating application connectivity across all screens, including; Web, PC, mobile, and STB platforms.

AMS servers enable a wide array of optimized interactive services for STBs, and are the foundation for a carrier wide, multi-service integration platform. Standard and Custom AMS Server Adapters leverage core server functionality to deliver use case specific capabilities including; Command and Control Messaging to end user devices, intelligent EBIF processing, server-side data compression, stream transformation, data manipulation, messaging aggregation, permanent and volatile storage of service related data, and the ability to execute complex business rules and decision engine processes concurrently across all AMS adapters and message streams. The AMS cloud based server farm provides an extendable/re-useable, back-end foundation capable of supporting numerous AMS Adapters for multiple Use Case/Application requirements.

The AMS solution supports standard J2EE environments, has expandable architecture, and provides horizontal scalability and fault tolerance via clustering. AMS supports flexible configuration capabilities and isolated Adapter interaction.

Figure 1:
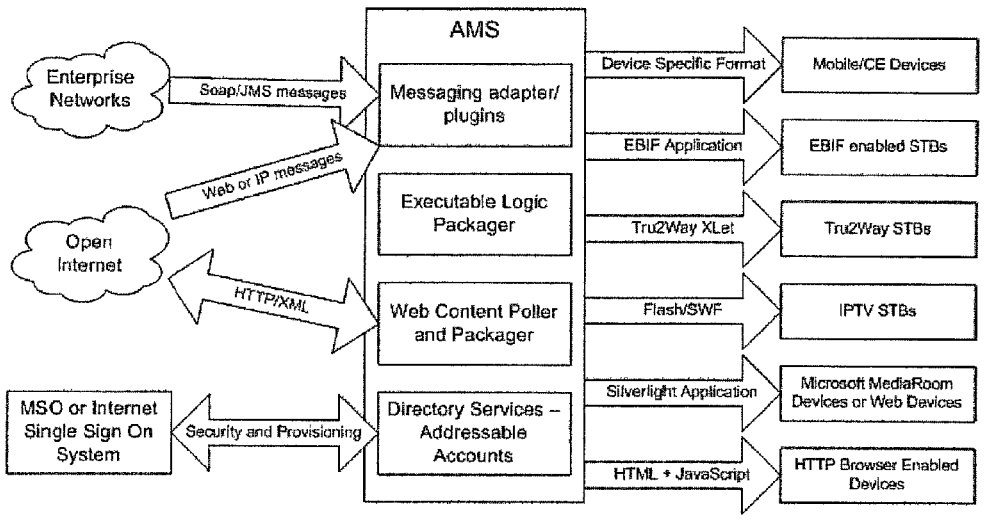
FIG. 1 is a schematic diagram of the cloud-based messaging software application infrastructure according to the invention.

The following abbreviations will be used throughout the application:
AMS Advanced Messaging Solution
BCFG Binary Configuration Dataset Format
BFS Broadcast File System
CAP Common Alerting Protocol
DNCS Digital Network Control System
DVR Digital Video Recorder
EBIF Enhanced TV Binary Interchange Format
EPG Electronic Program Guide
J2EE Java 2 Platform, Enterprise Edition
JMS Java Message Service
JSON Java Script Object Notation
MSO Multi-System Operator
SOAP Simple Object Access Protocol
STB Set-Top Box
VOD Video-On-Demand
WSDL Web Services Description Language
XML Extensible Markup Language
XMPP Extensible Messaging and Presence Protocol FIG. 1 depicts an exemplary embodiment of a communication system with a dynamic intelligent message processor middleware software component, hereinafter also referred to as Advanced Messaging Solution (AMS), residing on one or more server systems that accepts one or more data sources in multiple formats (message, web services, etc.) and processes that data into one or more output formats including but not limited to CSV, CFG, XML, BCFG, INI, ZIP, GZIP, EBIF, JSON, GScript, Microsoft Silverlight, TCP datagram, UDP packet, or opaque message types, by dynamic mapping and encapsulation of the business and/or presentation logic on the fly. The resulting output message is distributed using any of unicast, multicast, or broadcast network technologies consistent with service delivery to existing Cable TV broadband MPEG and DOCSIS networks and IPTV delivery systems over same or fiber networks.

The middleware server will receive from Enterprise Networks, the Internet and/or from a Multi-System Operator (MSO; for example, satellite/cable TV networks) or an Enterprise Single Sign On (SSO) System (a service that enables connection to multiple applications within a network using a common authentication mechanism) and pool predefined/ known message or content in any standard or proprietary methods including but not limited to, web services operations, JMS or TCP/IP/UDP messages. The middleware server will perform addressee lookup based on type and content of message to determine current message end point and device type. Based on the end point and type of message it will encapsulate content of the message into appropriate message format or executable code format applicable for target platform utilizing combination of real time compilation and set of predefined templates specific to the message and device type. As a result of this steps message or content will be transformed to the self-contained executable or to the message format recognizable by the target environment.

The transport component will send out self-contained message to the target platform and targeted device(s) for a consumption or an execution using platform specific delivery methods. Exemplary target platforms may include Mobile/ CE Devices; EBIF Enabled STB; Tru2Way STB; IPTV STB; Microsoft MediaRoom Device or Web Device; and HTTP Browser Enabled Devices illustrated in FIG. 1. For interoperability, the exemplary target platforms may have to be extended to support this server solution. In this case, an executable client needs to be created and executed on target platform to be able to listen to the BLOB (Binary Large Object) generic messages coming from the server, authenticate and validate origin of this message to ensure what this message is not received from unauthorized source and is safe for execution and pass this message to appropriate software component on this platform for execution.

Figure 2:
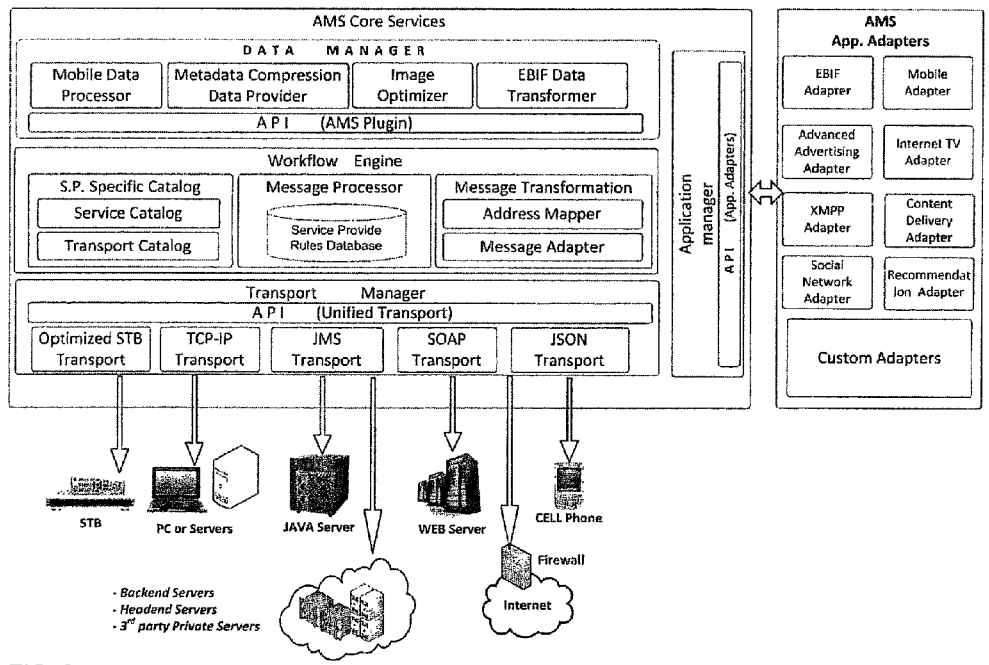
FIG. 2 is a detailed diagram of the internal architecture of the AMS server of FIG. 1.

The proposed AMS system according to the invention has the following advantageous features:
Aggregates and presents content and information properly formatted for all target systems and end user devices
Deployable regardless of the server hardware platform, end user device platform and network
Server-based, quickly and easily deployable with minimal integration concerns and low resource cost
Additional content options could include tweets, Facebook updates, RSS feeds, broadcast "walled garden" content, and any other applications able to be invoked by addressable messages
Personalized, subscriber level integration with all Web and mobile services with very economic terms. Short time to market with no service disruption and minimal development and integration efforts
Convergence of screens and content with user flexibility and higher satisfaction
Easy and fast entry to interactivity with a migration path to more advanced applications.
Competitive advantage and marketplace leadership
Low cost of entry with high perceived value among customers
Easy scalability of AMS instances in the server clusters as well as amount of server clusters
Redundancy degree as required
Standardized and fully configurable message processing flow to ensure fast customization and minimal costs of development, deployment and maintenance FIG. 2 presents AMS architecture, internal software modules, along with some sample services it may be used for. This document will further explain the details of the internal modules.

As shown in FIG. 2, AMS offers standard adapters for Mobile and EBIF processing, and will introduce new Standard Adapters, such as Advanced Advertising, Social Internet on TV or mobile devices and other adapters to simplify data processing for services associated with these adapters. In addition, Service Provider Custom Adapters can be implemented, per specific requirements.

Adapters are additional software modules that target data processing for a specific service. The Adapters process application specific business logic and functions. Each adapter can interact with each other or with AMS core services.

This feature enhances service performance.

The AMS Service Provider System consists of a Core Service framework and one or more optional standard Application Adapters or custom developed, Service Provider specific Adapters. Adapter interaction with all core Services are managed in conjunction with the Workflow Engine. The Workflow Engine receives data from the external devices, through the Transport Manager for subsequent processing by the Core Services. The Core Services restructure the input data stream performing aggregation, compression, optimization, and data transformation utilizing the Data Manager modules under the control of the Workflow Engine. The final output streams are delivered back through the Transport Manager to external devices or enterprise system interfaces.

A Software Development Kit (Adapter SDK) for AMS Service Provider System, for enhanced application development, will enable Service Providers to develop their own Application Adapters unique to their requirements, as shown in FIG. 2.

The details of the internal AMS architecture are explained in the following sections.

Figure 3:
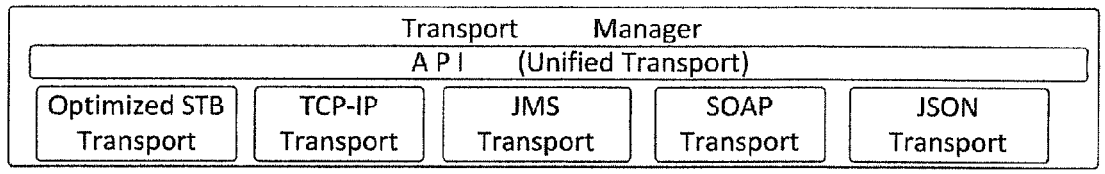
FIG. 3 shows details of the transport manager API of FIG. 2.

The Transport Manager along with some existing Transport Adapters, shown in FIG. 3, provides a unified API that can be leveraged by any AMS-compatible transport module. It handles all messages and requests from the transport layer to the AMS Work Flow Engine and Processors, and vice versa. The word "Transport" here refers to a facility that provides message delivery to/from End User devices/clients, or servers. Different transports support different protocols and messaging formats, utilize different network layers and are independent of each other. Any number of transports can be supported.

All transport processes and modules that are part of the AMS Service Provider System are structured and designed for optimization and scalability. These product modules can be customized as per MSOs and Service Providers' specific requirements.

The Optimized STB Transport Adapter is particularly designed for integration with DNCS networks of the MSO. This particular adapter is also enhanced with additional features not typically present in conventional DNCS transports. Examples of conventional transports are TCP, UDP, BFS, and HTTP. The enhanced features presented by Optimized STB Transport are:
  i. file name virtualization—allows for STB applications to operate with generic abstract transport API by hiding the details as to which specific transport (e.g. BFS, TCP, UDP, HTTP) is used for a given portion of data;
  ii. access control—restriction of transport access in the environments with multiple sources of files;
  iii. private namespaces—extension to access control feature. The private namespaces allows for MSO to assign file namespaces to each source of files;
  iv. bandwidth management—configuration based load balancing for BFS carousels;
  v. cache with priorities—automatic preemption of files under low memory conditions using priorities assigned to subsets of files or individual files;
  vi. pre-caching control—automatic loading and pre-caching of files before actual usage by applications for faster application initialization;
  vii. on the fly reconfiguration—allows for transport reconfiguration without the need of server and STB restart;
  viii. file version control—detection, monitoring, and notification of file version update;
  ix. support for STB application upgrade—low level features for upgrade process of the applications residing on the STB;
  x. targeting—delivery of files to dedicated STB population based on but not limited to such options as STB geographical location, hardware model, MAC address, local configuration, IP address or IP address range, etc; and
  xi. fault recovery—detection of faults and automatic remediation.

The TCP-IP Transport Adapter allows for rather low level transports such as TCP and UDP to be utilized where required by service business logic or where resource consumption optimized transport is a must or where custom binary message format is the only option. The transport used can be custom modified to suite specific needs of the MSO.

The JMS Transport Adapter is capable of sending messages between two or more clients, utilizing Java Message Oriented Middleware API. The messaging standard is based on the J2EE to generate, send, receive, and read messages. The JMS Transport Adapter can send, receive, and listen to any number of servers that support JMS. The Service Provider JMS Transport Adapter is the optimized version of the general JMS Transport Adapter, and is designed to meet MSOs specific needs.

A SOAP Transport Adapter is capable of exchanging structured information with other web servers, utilizing XML messaging format. The exchanges of the messages rely on the Application Layer, most notably on Remote Control Procedure and HTTP. The Service Provider SOAP Server is the optimized version of the general SOAP Server, and is designed to meet MSOs specific requirements.

The JSON Transport Adapter can produce lightweight text-based information, which is an open standard designed for human-readable data interchange. It is mostly used to transmit data between a server and a web application. This is an alternative method of exchanging data using XML-based formats.

Figure 4:
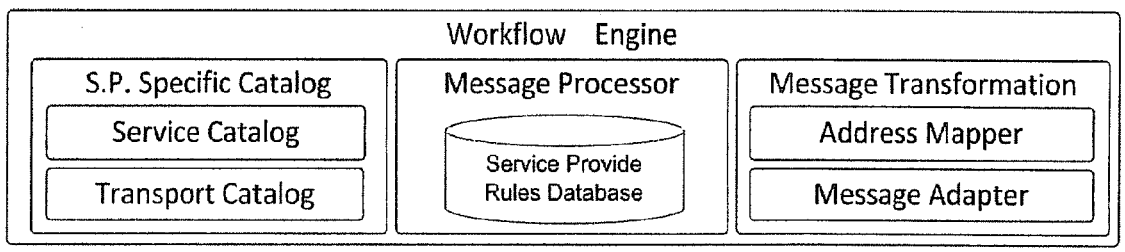
FIG. 4 shows details of the AMS workflow engine of FIG. 2.

FIG. 4 illustrates the internal modules of Workflow Engine. This is the central part of AMS platform and provides solution startup, and orchestrates all other components. It consists of the following components:

Service Catalog and Transport Catalog to enumerate Transports and Services available to the Workflow Engine.

Message Processor is a main component of the Workflow Engine. It uses the Rules Database module for two purposes:
  a. Decides whether or not a message should be processed by the Message Transformation Engine.
  b. Provides message routing according to the rules (the message may allow parallel or require sequential processing).

The Rules Database module of AMS contains the intelligence, the metadata, and the regulations for; Processing/Distributing the contents and the data to all appropriate transport modules/adapters, and to the final destination devices. To properly process asynchronous messages (i.e. when response may be received by a different AMS node) the Message Processor components deployed on different AMS nodes coordinate their states via JMS.

Message Transformation Engine processes both incoming and outgoing messages, based on their addresses, and performs the following services;
  a. Address mapping: The Address Mapper component shown in FIG. 4 manages and maps the STB addresses used by the Transport Manager. The User ID of the subscriber, the STB address, and the internal AMS processes are all managed and linked by this component. (E.g. converting MAC address of an end user device to its current IP address to be used by the selected Transport).

b. Message transformation: Different transports may be used to send a message to the same Business service. Messages will be transformed into a unified structure that will be accepted by all required Business services. Transformation logic is provided by the Message Adapters.

Figure 5:
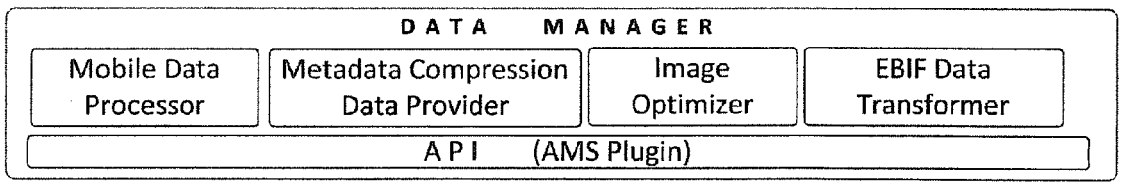
FIG. 5 shows details of the AMS data manager API of FIG. 2.

The Data Manager, shown in FIG. 5, contains sets of processes enabling interaction with external data servers (cloud based, or part of an MSO/SP network) as required.

All processes in the Data Manager utilize a unified API model to exchange queries and results to/from the Workflow Engine—This makes the structure very adaptive to new designs and services.

The EBIF Data Transformer will retrieve application specific data, such as information related to a Social Media Network (friends, profile, rating, etc.) or Sports Events (players, teams, standings, scores, game schedules, etc), and provide that information to the Workflow Engine in the form of the EBIF application or resource. In cases where multiple accesses are needed, this module aggregates the EBIF essential data, and reduces the number of transactions.

The Image Optimizer is intended to transform graphical images into most optimal format for the STB in terms of consumption of bandwidth, end user device memory, and end user device CPU performance. It takes any image as an input and transforms it to a size requested by the application, removes unneeded metadata, corrects coloring (e.g. no real white to preserve TV), etc. This process module provides the results to the Workflow Engine for processing in the form of the optimized and optionally scaled graphical image.

Metadata Compression Data Provider—is an encoding utility designed to convert practically any structured and unstructured dataset into highly optimized data format called BCFG. The resulting binary format dataset is either generic or application specific (e.g. EPG, VOD) and features the following:

i. Explicit data types—control the data using predefined set of data types, namely variable width integers, strings, Booleans, bit arrays, blobs, images, and nested tables. This allows for earlier data value error detection and lesser CPU consumption on the end user devices;
  ii. Automatic data compression—the values are compressed in order to reduce the size of the resulting binary dataset. This reduces the bandwidth usage and memory consumption on the end user devices;
  iii. Image inclusion—the images are included into the resulting binary dataset thus reducing network latencies, reducing the amount of file requests, and optimizes the memory consumption on the end user devices;
  iv. Data integrity control—the data integrity is enforced by means of separation of fixed size data and variable size data as well as other techniques for forming the internal structure of the dataset. This allows to reduce the code size of the applications as well as save on CPU performance of the end user devices;
  v. Automatic integer width—the least required width for integers is automatically detected and used based on the supplied values. This feature results in reduced memory consumption on the end user devices;
  vi. Compressed data access—the data can be fetch without prior decompression. This greatly saves on memory consumption on the end user devices;
  vii. Postponed initialization—the binary dataset can be initialized right before it is used rather than when it has been loaded into the memory. This allows for optimized and balanced CPU performance utilization on the end user devices;
  viii. On demand data access—the required value can be accessed at near real time speed when it is required without the need for prior instantiation of all the values supplied within the binary dataset. This greatly reduces consumption of memory and CPU performance on the end user devices;
  ix. Prefixed format—all the metadata required to fetch any given value precedes the value itself thus significantly reducing the consumption of CPU performance of the end user devices;
  x. De-duplication of strings, images and blobs—all duplicated images, strings and blobs are automatically detected and removed by means of hashes and binary comparison. This reduces the consumption of bandwidth and end user device memory;
  xi. Unified access to the structured and unstructured data—the data supplied with binary form of the dataset is accessed seamlessly on the end user devices regardless of the initial level of structuring of the data. This reduces the complexity of applications on the end user devices; and
  xii. Nested datasets—in some embodiments any cell of the dataset can contain nested dataset. This reduces the bandwidth usage and CPU performance and memory consumption on the end user devices.

In some cases during interactions with $3^{rd}$ party applications, it is more productive to replace several STB requests with a single request, and to allocate the remaining low-level logic to the server-side. The Metadata Compression Data Provider module was designed to serve these types of tasks.

An example is the interaction of the STB with an external Search server. The problem is that some Search servers cannot provide filtering. In a case when filtering is required, the end user device has to send several requests to the server to complete the rendering of at least one search result screen.

To contrast the above, AMS can optimize protocols and bandwidth usage. Following the Search server example above, the AMS will allow for the end user device to issue a single search request to the AMS while automatically issuing as many requests to the Search servers as needed. In this way, valuable bandwidth in between AMS and end user device is preserved and protocol tunneling takes place. AMS executes the required number of requests to the Search server to accumulate the required amount of search results. When this amount is reached, a response for the STB is sent.

Advantages of this approach:

Reduced number of requests from the STB—advantageously, only a single AMS request is required. Under a non-AMS paradigm, where direct connection between the end user device and the Search server is required, up to 15 requests (based on real life AMS installations) will be generated to reach the same result and will thereby increase the network load.

Decrease of traffic amount—AMS requests and responses are in a compressed binary format instead of a traditional HTTP and XML request. This reduces the amount of data that is transferred 3-4 times faster than with a direct connection between the end user device and the server.

The STB advantageously may not require additional logic—all filtering and additional requests are provided configuration options of the AMS instance, thereby reducing the required end user device CPU performance and amount of its memory needed.

AMS applies the Service Provider Edition System optimization process to the Data Manager Processes and Modules.

Figure 6:
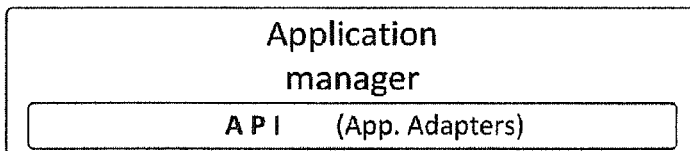
FIG. 6 shows details of the application adapter APIs in communication with the application manager of FIG. 2.

The Application Adapter Manager, shown in FIG. 6, provides the interface between one or more Adapters and the internal AMS framework. The Application Adapter Manager interface in effect provides the "glue" between application specific business logic and the internal Workflow Engine subsystem. The Application Adapter Manager implements an abstract set of interface definitions, enabling for the integration of external Adapter modules in a consistent and extensible manner.

AMS Business Service Adapters, shown in exemplary form in FIG. 2, provide key functionality by today's emerging multi-device, interactive applications. They provide value-added use case or application services that encapsulate target business logic and/or a Business Service. In a standard interaction lifecycle, the Business Service is a final addressee for messages to/from end user devices, and a source for response messages. Additionally, subsidiary modules used for data transformation (e.g. image optimization) may be represented as Business Services.

However, in its basic form, the message processing can be accomplished without Business Service invocation by utilizing the features of the Workflow Engine. The Business Service Adaptors are used and developed when there is an explicit need.

Custom Business Service Adapters are built per Service Providers specific requirements. They address specific business logic, and will interact with other modules of the system via a common API exposed towards Workflow Engine. Standard Adapters will address industry standard business logics and services. For example, an EBIF Business Service Adapter is designed to translate and convert XML data and information that is required by the EBIF User Agent running on the STB, into the form of EBIF resources acceptable by EBIF User Agent on the end user devices. This may reduce the message delivery time by preprocessing data in the cloud, and minimizes the resource usage at the STB.

A Mobile Business Service Adapter is an adapter that enables mobile services to interact with interactive TV services in a cross platform manner.

An XMPP Business Service Adapter can be utilized to delivery Internet scale host messaging, optimize texting and SMS service integration.

A Recommendation Business Service Adapter can be applied to optimize personalized services based on subscriber specific profiles and device usable patterns.

Emergency Alert Business Service Adapter leverages such AMS features as XML and CAP message formats, multitude of readily available Transport Adapters and on demand degree of redundancy to provide reliable emergency alert relay from authorized alert sources towards multitude of legacy MSO networks using specific transports of the latter.

Internet Data Feed Business Service Adapter is a unified AMS component for random and scheduled fetching of data feeds from multitude of information providers that supply their data using XML format and its derivatives. This Adapter manages the scheduled data feed polls and applies necessary data filtering, sorting, storage, caching and similar processing before the data will be sent to the consuming system or end user devices using any of the available Transport Adapters.

These adapters provide additional business logic not present in any of the partnering systems integrated through AMS. This AMS feature presents the end users with the higher level business services that are not available in any other of the systems used.

New Application Adapters may target specific business services, such as Facebook, Twitter, and Social Network Media service integration, and applications. These are only some example of the Business Service Adapters that can be implemented. Business Service Providers are now able to use this capability to create and optimize new enhanced services.

Figure 7A:
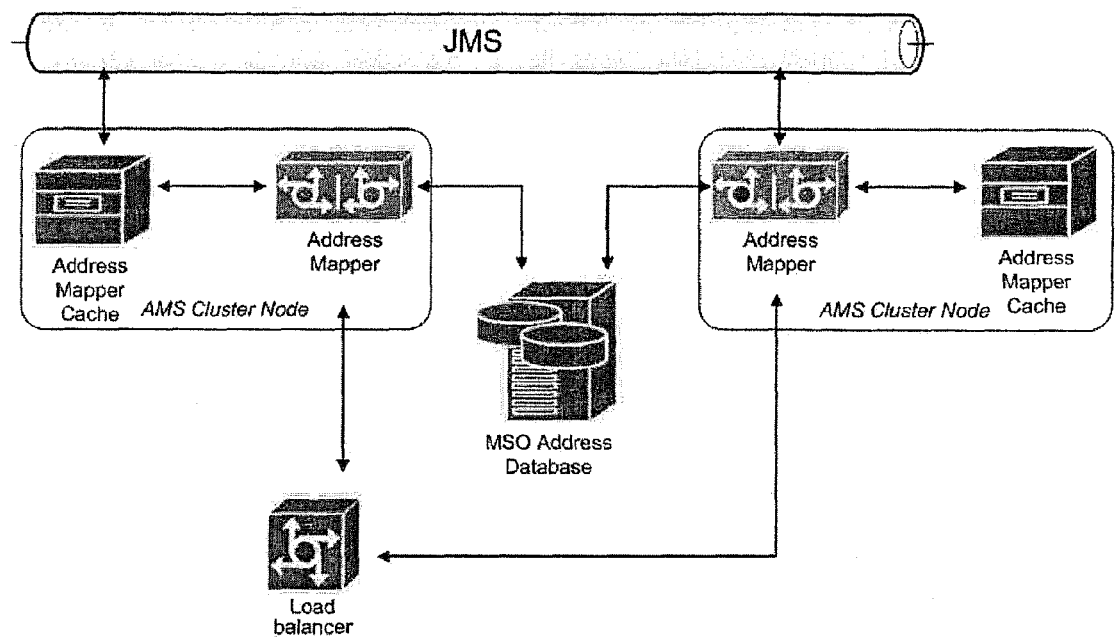
FIGS. 7A-C show address mapping and clustering using Java Messaging System (JMS) transport of FIG. 3.
Figure 7B:
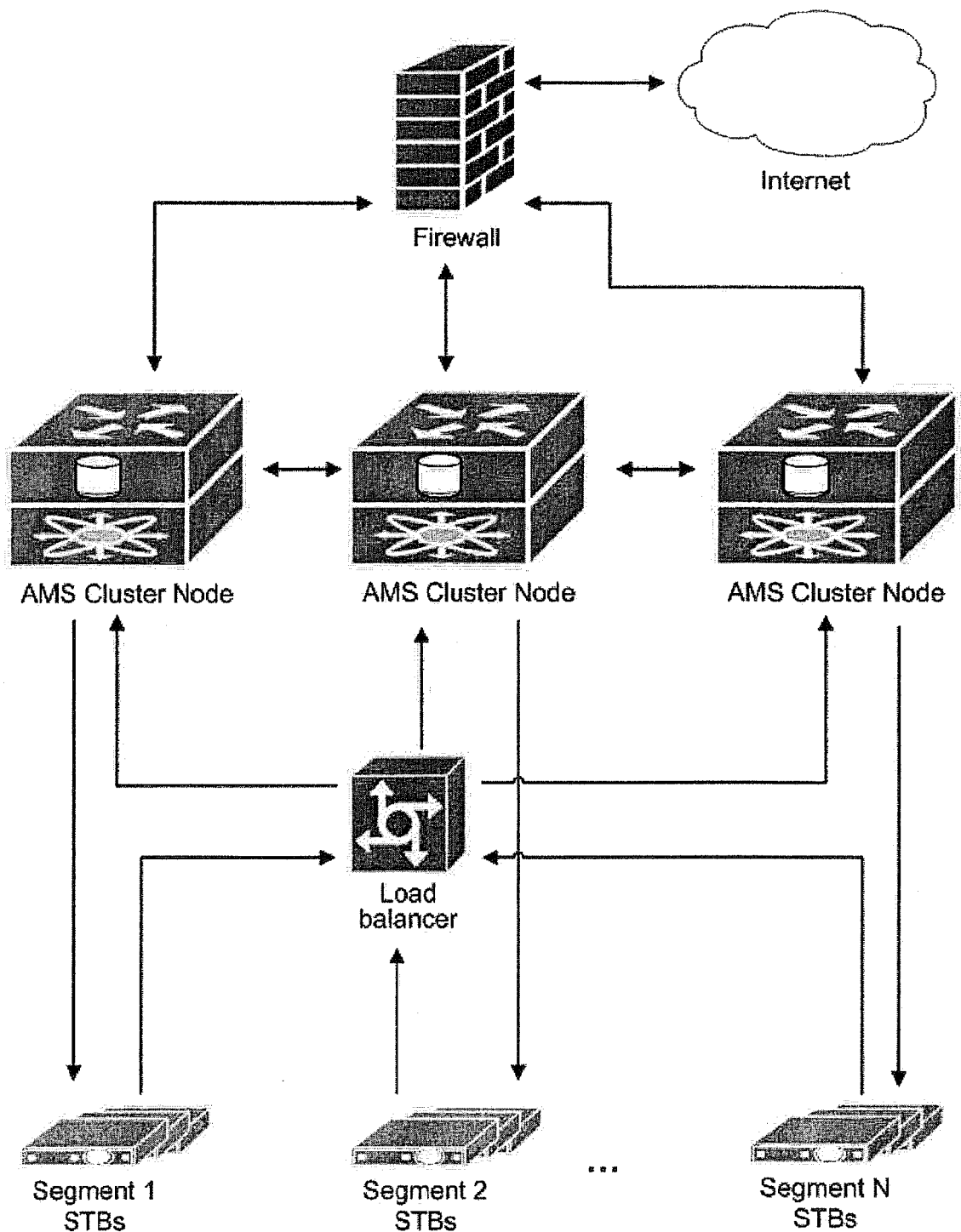
Figure 7C:
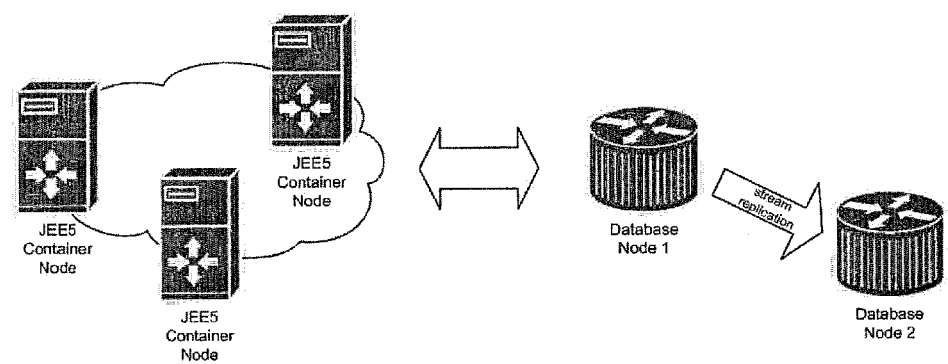

FIGS. 7A-7C are high level diagrams illustrating redundancy, load balancing, database sharing, failover and cluster nodes.

FIG. 7A illustrates the logic of the addresses as the binding data flows. The Address Mapper of each AMS Cluster Node has its own caching and mapping of the data and periodically (predicated upon network load) provides bulk broadcast transmission of all data updates via JMS.

FIG. 7B demonstrates the AMS clustering solution. The Cluster may contain an unlimited number of nodes. Data synchronization is provided via JMS and Database, as shown in FIG. 7A.

FIG. 7C shows the clustering of multiple AMS Servers. AMS Services connect directly to the DB Node and read and update data in storage. To increase system robustness another DB Node is deployed and Server replication is provided in real-time.

In summary, without the AMS solution, all $3^{rd}$ party applications must implement their own API on end user devices in order to interact with the other devices and MSO systems, which is difficult, resource consuming, and often non feasible due to technical and economical reasons. When AMS is utilized, all $3^{rd}$ party applications will only have to support the AMS Service Manager API and need not implement the logic for dedicated hardware addressing, protocols, etc. In addition, AMS perceives these applications as typical Business Services.

Figure 8:
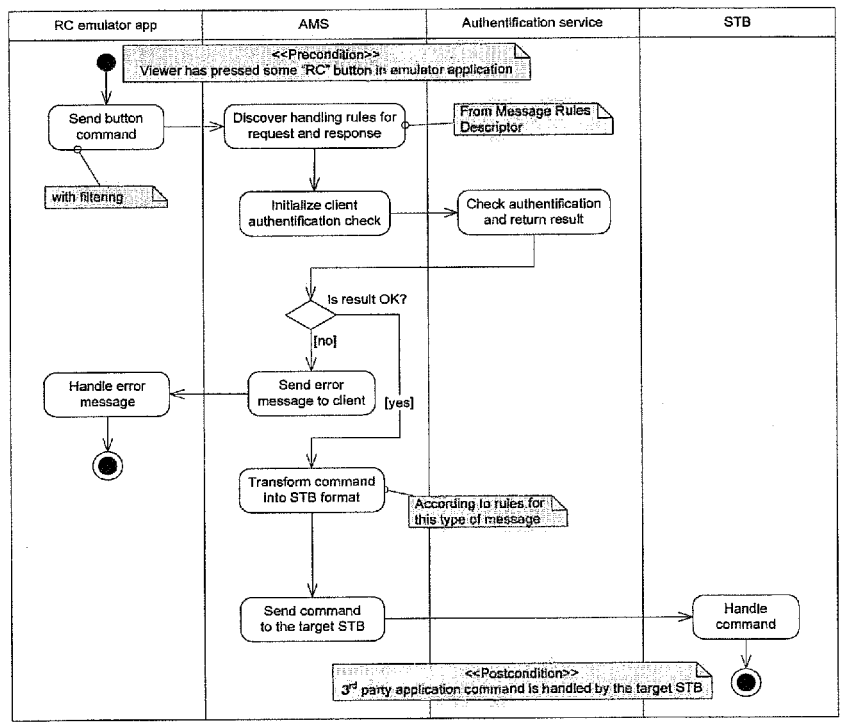
FIG. 8 shows a process flow for remote control emulation.

As shown in the exemplary schematic process flow diagram of FIG. 8, AMS provides all checks, transformations and routing of messages, according to the rules set contained in the Message Rules Descriptor. During these operations, the external Business Services can be used for an authentication check. Additional Message Adapters provide transformation. The message is then sent to the end user devices (STB in this case) in the format interpreted by the client as a standard remote control command.

The exemplary diagram on the FIG. 8 as detailed in the following paragraphs.

The subscriber's consumer electronic device, which already has the Remote Control Application installed, sends the command to perform a Remote DVR operation, such as record, browsing, etc.

The request is submitted to the AMS server, processed by Workflow Engine.

It authenticates and gets the results from a $3^{rd}$ Party Data Provider.

It transforms the data to STB format, and transmits the results to the STB.

Advantages of this approach:
Easy implementation for $3^{rd}$ parties—lightweight API provided by AMS in standardized format (e.g. WSDL).
Configured filtering rules—an engineer can change the algorithm of messages passing via Message Rules Descriptor, adding mandatory checks by external Business Services. Also for different STB models, different command formats can be supported by Message Adapters switching in accordance with the variable conditions.

Figure 9:
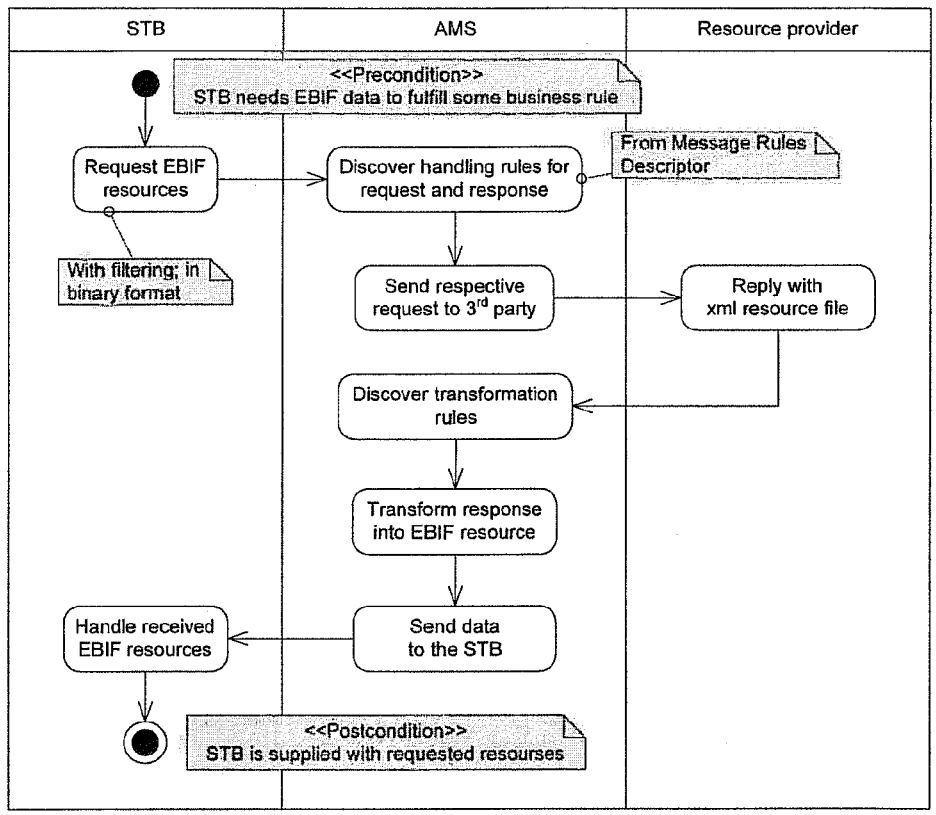
FIG. 9 shows a process flow for an EBIF adapter connected to the application adapter.

The exemplary EBIF processing diagram is shown on the FIG. 9. Its steps are detailed in the following paragraphs.

To fulfill the requirements of EBIF applications, all resources should be prepared in specialized formats and injected into the MPEG Server or downloaded by the STB from an object carousel, so that the EBIF client can receive them.

Utilizing the AMS server, a more flexible solution can be implemented. When an STB application is required to display dynamic data over the linear signal (e.g. weather, advertising, etc.) it requests this data from the 3rd party data provider, as shown in the schematic process flow diagram of FIG. 9.

AMS receives this request, and then via the Message Rules Descriptor, finds out which data should be sent as the appropriate response, and gets this data from the Business Service, which in some cases can be a web site. AMS then translates the response on-the-fly into the EBIF resource format and sends it to the STB via the appropriate Transport as defined by the Message Rules Descriptor. The STB receives this data and it is then handled by the EBIF client.

Advantages of this approach:
No need to use the object carousel in this data flow—files can be delivered via TCP/IP, and the STB tuner is not utilized.
Delivery time decreased—when data is delivered via the object carousel, EBIF resources can take up to several minutes to be downloaded, depending on the carousel size and the speed.
Flexible sources—any data can be used as EBIF resources in real-time. The only condition is to support the respective Message Adapter format.

Figure 10:
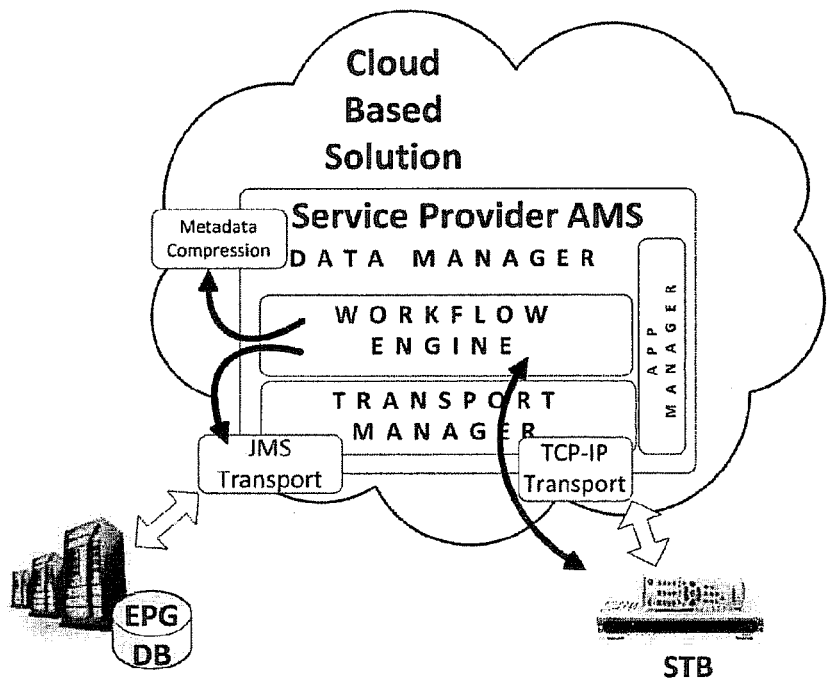
FIG. 10 is a schematic diagram of EPG data flow to an STB using the AMS.

FIG. 10 illustrates schematically an exemplary data processing flow and the interaction of the Workflow Engine with the STB device, as well as data retrieval from an EPG database.

The EPG process starts with the subscriber initiating an EPG Request.
AMS receives the request through the TCP/IP layer and Transport Manager submits the request to the Workflow Engine.
Workflow Engine processes the request, and pulls the information via the JMS, performs compression & aggregation, and delivers the data through the Transport Manager to the STB.

In summary, the AMS Service Provider Solution provides a total cloud based solution, enabling Service Providers to offer enhanced and interactive network services to their subscribers commensurate with industry demands. These services extend across multiple platforms and devices, utilizing the state of the art software technologies, empowering Service Providers' subscribers with flexibility and mobility that can add value to Service Provider service offerings.

AMS is built as freely scalable solution with arbitrary degree of redundancy. In order to achieve required degree of redundancy AMS can be deployed in any number of physical locations each having any number of AMS clusters each comprising any number of AMS instances.

The redundancy can be accompanied with either of distributed, duplicated, or combined message processing load. Distributed message processing is configured so that each individual message is only processed by single AMS instance. Duplicated message processing load is configured so that each individual message is processed by all AMS instances producing the same result and performing de-duplication in order to avoid unnecessary duplication of outbound messages. Combined message processing load comprises both distributed and duplicated message processing loads to achieve optimal redundancy while preserving excessive financial expenses.

AMS redundancy may comprise the following:
i. Redundant links. Support for arbitrary amount of redundant inbound and outbound physical and logical connections;
ii. De-duplication rate. Outbound messages can be sent to destination parties at arbitrary rate of de-duplication;
iii. AMS instance priorities. Redundant AMS instances automatically negotiate for message processing and message delivery priority;
iv. Disconnected domains. In the event of inter-AMS instance connection outage, redundant AMS instances automatically arrange themselves into disconnected domains as if they were so configured intentionally. No additional priority voting is required in this case;
v. Connection recovery. Upon connection recovery, the disconnected domains automatically restore themselves into single multi instance orchestra;
vi. Redundant business service instances can reside as required at physically diverse or the same server hardware instances, arbitrary amount of AMS instances, and geographically agnostic locations;
vii. Inter-server message bus connecting all AMS servers at all geographically diverse locations;
viii. Server priority assignment at bootstrap. Each server attempts to gain as highest priority as it can. The higher priority is assigned to the earliest bidder. In the unlikely event of identical registered start time all conflicting servers will pause for random time within predefined period (e.g. 2 seconds) and then try to obtain the priority again;
ix. Inter-server links health monitoring. Each AMS server constantly monitors the availability of inter-server links. In the event of link failure, the servers are reorganized into disconnected "domains". E.g. both AMS farms may become separate domain disconnected from each other when inter-farm links fail;
x. Outbound message verification. All servers process inbound messages in parallel and compare with each other results;
xi. Send message to destination system. The highest priority server in each domain is responsible for sending the message to destination servers and notifies the lower priority servers about success/failure. In case of failure (e.g. link to certain destination service is unavailable) it orders the lower priority server to send message to that specific destination.

Figure 11:
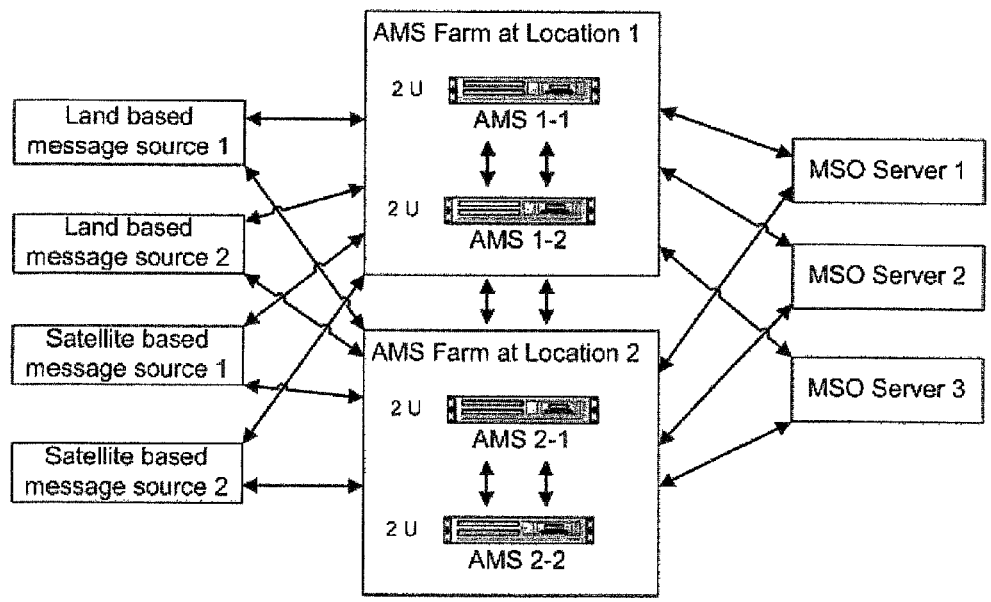
FIG. 11 is an exemplary diagram depicting AMS redundancy capabilities.

The FIG. 11 depicts the exemplary configuration of AMS redundant installation.

There are two satellite source message systems and two land based source message systems. Each message is duplicated by all sources message system and delivered to each AMS instance via duplicated links.

Each AMS instance processes the incoming message and produces the same result. De-duplication protocol takes effect in order to eliminate.

The outbound message is then sent to all three destination systems by current AMS master. All other AMS instances monitor the success of this sending in order to carry the message delivery on in the event of master AMS instance failure or link outage.

The AMS system architecture was developed with a modular design in mind to make the system platform adaptable to any new environment. This enables all Service Providers that utilize the AMS system within their network to offer faster Time-To-Market turnaround.

While the invention is receptive to various modifications, and alternative forms, specific examples thereof have been shown in the drawings and are herein described in detail. It should be understood, however, that the invention is not limited to the particular forms or methods disclosed, but to the contrary, the invention is meant to cover all modifications, equivalents, and alternatives falling with the spirit and scope of the appended claims.

What is claimed as new and desired to be protected by Letters Patent of the United States is:

1. A method of operating a messaging system, comprising:
    receiving at least one message at a messaging system, said message being in at least one format supported by at least one message adapter forming a part of a message source;
    checking said at least one message by an external service in accordance with a set of rules stored in a rules database;
    transforming said at least one format of said at least one message to another message format according to said set of rules;
    routing said at least one transformed message to an application adapter in accordance with said set of rules;
    processing said transformed message by said application adapter;
    optimizing data required for response from other services by an algorithm of said message adapter;
    routing said transformed message from the application adapter to a business service adapter in accordance with said set of rules;
    processing said routed message by said business service adapter;
    obtaining said optimized data required for said response from said other services by an algorithm of said business service adapter;
    storing said data in a memory accessible by said messaging system on behalf of said message source;
    transforming said obtained data by said business service adapter into a response message using the message format in accordance with said set of rules;
    routing said response message to the message adapter in accordance with said rules; and
    transmitting said response message by said message adapter to a recipient via an optimized set-top box (STB) transport adapter in accordance with said set of rules, wherein the optimized STB transport adapter includes a file name virtualization for allowing a STB application to operate with abstract transport API (application program interface) by hiding a specific transport protocol used for the received message or the response message.

2. The method of claim 1, further comprising steps for flexible message processing:
    using a transport manager providing unified access to all multiple transports supported by transport adapters forming a part of said messaging system;
    extending said messaging system with support from other transports by adding additional transport adapters to said messaging system;
    transforming message formats supported by message adapters forming a part of said messaging system; and
    further extending said messaging system by means of additional message formats by adding additional message adapters to said messaging system.

3. The method of claim 1, further comprising steps related to operation of a workflow engine:
    reading said set of rules from said database;
    execution of the said set of rules;
    providing message processing algorithms defined by said set of rules;
    extending said messaging system by means of additional message processing algorithms by adding additional rules to said set of rules to store in the database; and
    routing messages between transport adapters, message adapters, application adapters, and business service adapters in accordance with said set of rules.

4. The method of claim 1, further comprising steps of integration different systems and devices capable of sending and receiving messages therebetween without said different systems and said devices being modified prior to said steps of integration:
    communicating with said different systems and said devices using transports known to said different systems and said devices, said known transports forming a part of said messaging system;
    transforming the messages from a format known to said different systems and said devices that send said messages to a format known to said different systems or said devices that receive said messages;
    generating for said different systems and devices data and applications that said systems and devices are capable of consuming;
    storing said data in said memory on behalf of said different systems and devices; and
    providing additional logic to said different systems and devices by means of said set of rules.

* * * * *